(12) United States Patent
Brodowski et al.

(10) Patent No.: US 10,081,927 B2
(45) Date of Patent: *Sep. 25, 2018

(54) SYSTEM AND METHOD FOR PROTECTIVE COATING OF REINFORCEMENT

(71) Applicant: Inventure Civil, LLC, Wake Forest, NC (US)

(72) Inventors: David M. Brodowski, Dayton, OH (US); Timothy J. Brereton, Rolesville, NC (US); Michael F. Eraña, Apex, NC (US)

(73) Assignee: Inventure Civil, LLC, Wake Forest, NC (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/400,402

(22) Filed: Jan. 6, 2017

(65) Prior Publication Data

US 2017/0183841 A1 Jun. 29, 2017

Related U.S. Application Data

(63) Continuation of application No. 14/671,421, filed on Mar. 27, 2015, now Pat. No. 9,574,318.

(60) Provisional application No. 62/125,054, filed on Jan. 12, 2015.

(51) Int. Cl.
| | |
|---|---|
| *E02D 31/06* | (2006.01) |
| *B05D 1/02* | (2006.01) |
| *C23C 2/38* | (2006.01) |
| *C09D 175/04* | (2006.01) |
| *C09D 175/02* | (2006.01) |
| *E02D 29/02* | (2006.01) |
| *C09D 5/08* | (2006.01) |

(52) U.S. Cl.
CPC ............ *E02D 29/02* (2013.01); *B05D 1/02* (2013.01); *C09D 5/08* (2013.01); *C23C 2/38* (2013.01); *E02D 31/06* (2013.01); *E02D 2300/0006* (2013.01); *E02D 2300/0026* (2013.01)

(58) Field of Classification Search
CPC ..................................................... E02D 31/06
See application file for complete search history.

(56) References Cited

U.S. PATENT DOCUMENTS

| | | | |
|---|---|---|---|
| 4,116,010 | A | 9/1978 | Vidal |
| 4,124,983 | A | 11/1978 | Weatherby |
| 5,249,898 | A | 10/1993 | Stepanski et al. |
| 5,472,296 | A | 12/1995 | von Allmen et al. |
| 5,797,706 | A | 8/1998 | Segrestin et al. |
| 6,313,254 | B1 | 11/2001 | Meijs et al. |
| 6,719,487 | B2 | 4/2004 | Yukimoto et al. |
| 7,270,502 | B2 | 9/2007 | Brown |
| 8,079,782 | B1 | 12/2011 | Hilfiker et al. |
| 8,685,303 | B2 | 4/2014 | Simmons et al. |

(Continued)

OTHER PUBLICATIONS

International Search Report and Written Opinion for PCT/US2016/013028, dated Feb. 23, 2016 (8 pages).

(Continued)

*Primary Examiner* — Tara Mayo-Pinnock
(74) *Attorney, Agent, or Firm* — Bookoff McAndrews, PLLC

(57) ABSTRACT

A coated member is disclosed. The coated member has a member and a coating disposed on the member. The member is metallic and the member is bent at two or more locations along a length of the member. The coating is an elastomeric coating. The coated member is a soil reinforcing member.

20 Claims, 13 Drawing Sheets

(56) References Cited

U.S. PATENT DOCUMENTS

| 8,927,112 | B2 | 1/2015 | McKittrick et al. |
|---|---|---|---|
| 2003/0185634 | A1 | 10/2003 | Babcock |
| 2012/0114963 | A1 | 5/2012 | McKittrick |
| 2013/0035466 | A1 | 2/2013 | Vanlandschoot et al. |

OTHER PUBLICATIONS

Daggett, Susan. "A Guide to Selection of methacrylate, urethane and epoxy adhesives." Composites World website, dated Apr. 1, 2004, retrieved from http://compositesworld.com/articles/a-quide-to-selection-of-methacrylate-urethane-and-epoxy-adhesives. (6 pages).
BASF Technical Product Data, Elastocoat AC 72376R Resin, dated Aug. 15, 2012, retrieved from http:///www.polyurethanes.basf.us/files/pdf/Elastocoat%20AC%2072376R72375T72375TTechnical%20Product%Data.pdf (2 pages).
"K-Stiffness Method", FHWA NHI-10-025 MSE Walls and RSS—vol. II, Nov. 2009 excerpt, (1 page).
"Reduced Zinc Loss Rate for Design of MSE Structures," A White Paper by the Association for Metallically Stabilized Earth, pp. 7-10, May 2006 (4 pages).
"AASHTO LRFD Bridge Design Specifications," excerpt from Section 11: Walls, Abutments, and Piers by the American Association of State Highway and Transportation Officials, 2012 (14 pages).
"Line-X Spray-On Truck Bedliners," product information dated Dec. 14, 2006, retrieved from https://web.archive.org/web/20061214112649/http://linex.com/.
"Speedliner," product information dated Dec. 21, 1997, retrieved from https://web.archive.org/web/19971221171358/http://speedliner.com/qual.htm.
Rhino Linings World-Class Protection—Coatings for Bridge Preservation: "Protective Lining Over Steel and Concrete," product information, Rhino Linings Corporation 2014, retrieved from www.rhinoliningsindustrial.com (2 pages).

SYSTEM AND METHOD FOR PROTECTIVE COATING OF REINFORCEMENT

This application is a continuation application of and claims the benefit of priority to U.S. patent application Ser. No. 14/671,421, filed Mar. 27, 2015, which claims the benefit of U.S. Provisional Patent Application Ser. No. 62/125,054, filed Jan. 12, 2015, which are hereby incorporated by reference in their entireties.

TECHNICAL FIELD

The present disclosure is directed to a coating system and method and, more particularly, to a system and method for protective coating of reinforcement.

BACKGROUND

Many construction projects include providing coated metallic elements in locations of varying levels of corrosivity, such as in aggressive and/or non-aggressive soils for corrosion. Metallic elements may be disposed in soils that may cause corrosion over relatively long periods of time, or in soils that may cause corrosion in relatively shorter periods of time such as areas exposed to chemical deicing, tidal water, or ground water. Use of coated metallic elements in either aggressive or non-aggressive soils often results in increased degradation of the coating and base metal of the coated metallic elements over time. Such degradation may result in a reduction of a service life of a structure.

Conventional methods for protecting metallic elements in the above situations typically involve providing metallic elements including steel strips or wires that are galvanized or aluminized. For galvanized coatings, steel strips or wires are typically configured into a final geometry, then hot-dip galvanized in a bath of zinc. For aluminum coatings, a sheet of steel coil is typically dipped in a bath of pure aluminum, and then the steel coil is slit and the steel strips are configured into a final geometry.

One disadvantage of these conventional systems involves the additional metal needed beyond an amount appropriate for strength and serviceability design to account for corrosion of metallic reinforcements within an area subject to corrosion (e.g., within an earth mass as in mechanically stabilized earth applications). For example, typical design specifications for highway infrastructure set forth that a design should account for 75 or 100 years of corrosion, which typically results in an increase in supplied metal thickness of metallic elements of approximately 50% to 100% more than a nominal amount appropriate for strength and serviceability design.

U.S. Pat. No. 8,927,112 (the '112 patent), issued to McKittrick, describes a protective coating for use in a mechanical connection of a mechanically stabilized earth structure. The method disclosed in the '112 patent includes applying a dielectric barrier coating on a structurally compromised region of a tensile member to delay an onset of corrosion.

Although the system disclosed in the '112 patent may provide a method for delaying an onset of corrosion, the system does not provide a method for accounting for corrosion of a coated metallic element over substantially an entire service life of a structure. Further, the system disclosed in the '112 patent does not appear to provide a method for providing relatively thinner metallic elements that account for corrosion over a service life without having increased thicknesses to account for corrosion.

The present disclosure is directed to overcoming one or more of the shortcomings set forth above.

SUMMARY OF THE DISCLOSURE

In accordance with one aspect, the present disclosure is directed toward a coated member. The coated member includes a member and a coating disposed on the member. The member is metallic and the member is bent at two or more locations along a length of the member. The coating is an elastomeric coating. The coated member is a soil reinforcing member.

According to another aspect, the present disclosure is directed toward a method. The method includes providing a member, bending the member at a plurality of locations along a length of the member, and coating the member with an elastomeric material. The coated member is a soil reinforcing member.

DETAILED DESCRIPTION

Figure 1:
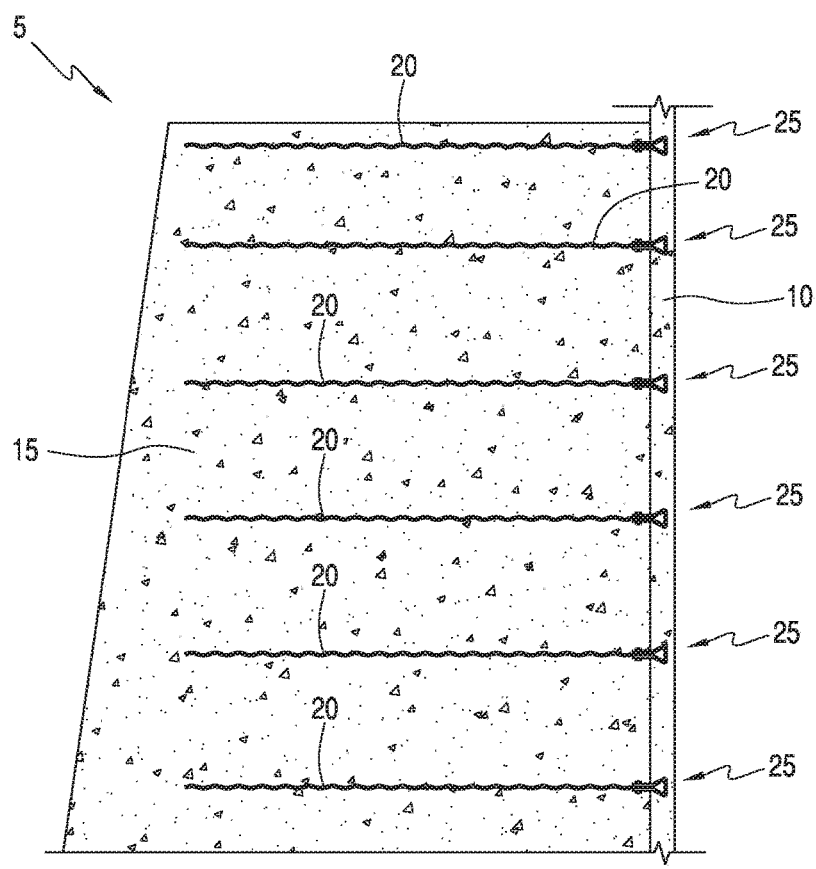
FIG. 1 is a sectional view of an exemplary structural system.

FIG. 1 illustrates an exemplary structural system 5 for supporting a loading. Structural system 5 may be any suitable structural system for supporting load such as, for example, a mechanically stabilized earth (MSE) structural system such as an MSE wall. Structural system 5 may also be, for example, a structural system disposed in or near corrosive soil or a structural system disposed in an area exposed to chemical deicing. Further, for example, structural system 5 may be a structure disposed at or near a tidal water area or at or near an area having ground water. Structural system 5 may be, for example, a structural system disposed on land, a marine structural system, or a coastal structural system. Structural system 5 may also be a structure disposed in or a near a non-aggressive soil that may cause corrosion after a relatively long period of time.

Figure 2:
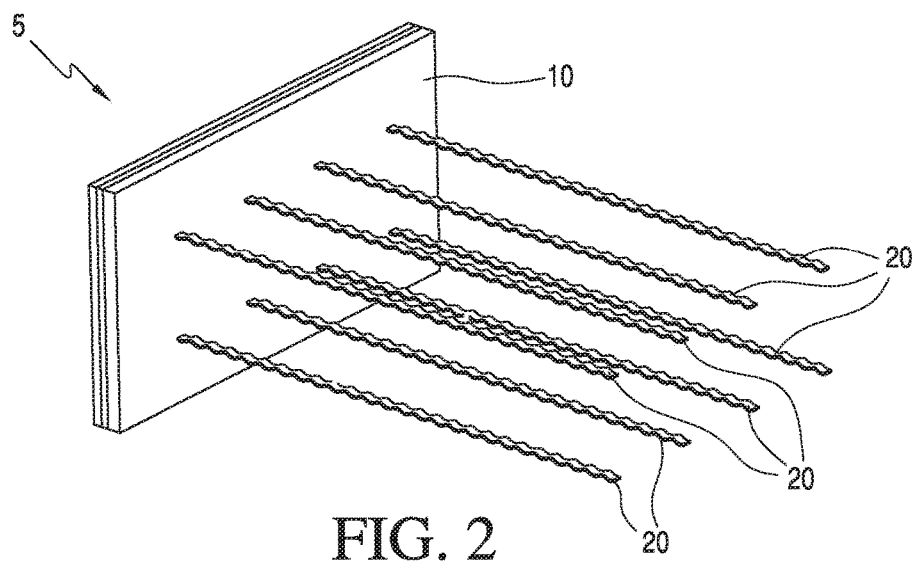
FIG. 2 is a schematic illustration of the exemplary structural system.

As illustrated in FIGS. 1 and 2, structural system 5 may include one or more structural members 10, material 15, one or more reinforcing members 20, and one or more connection assemblies 25. Structural member 10 may support material 15. Reinforcing member 20 may be disposed in material 15 and may reinforce structural system 5 by supporting structural member 10. Connection assembly 25 may connect structural member 10 and reinforcing member 20.

Structural member 10 may be any suitable structural element for supporting load such as, for example, a load associated with material 15. Structural member 10 may be formed from any suitable structural material such as, for example, concrete, steel, polymeric material, composite material, wood, plastics, compacted material such as fill or organic material, or any other suitable material for supporting load. For example, structural member 10 may be a prefabricated concrete panel, a cast-in-place reinforced concrete panel, a container containing fill such as a canvas container, or a polymeric or plastic structural member. Structural member 10 may be an integral structural member or may be part of a modular structure including a plurality of structural members 10. For example, structural member 10 may be a precast panel and a plurality of structural members 10 may form an MSE panel wall that supports material 15. For example, structural member 10 may be a concrete fascia member. Also, for example, structural member 10 may be an integral structural member such as a cast-in-place concrete wall, steel structural member, plastic structural member, slurry wall, hybrid structural member, composite structural member, and/or any other suitable structural member for supporting material 15. Further for example, structural member 10 may be suitable for retaining earth.

Material 15 may be any suitable material for use in structural system 5. For example, material 15 may be soil such as compacted soil and/or non-compacted soil. Material 15 may include organic material and/or fill material. For example, material 15 may include sand, expanded shale, crushed stone, gravel, silt, coal, clay, sand, stones, glass and/or synthetic materials. Material 15 may include fine aggregate material and/or coarse aggregate material. Material 15 may include any suitable earth or soil material. Material 15 may be natural and/or manmade material. Material 15 may be unreinforced, natural material and/or reinforced material including cementitious material, plastic mat reinforcement, artificial material such as plastics, additives, and/or any other suitable material for use in structural system 5.

Reinforcing member 20 may be any suitable type of member for reinforcing structural system 5. As illustrated in FIGS. 3-6, reinforcing member 20 may include a member 30, a coating 35, and an aperture 40. Coating 35 may provide a protective layer for member 30, and aperture 40 may be disposed at an end portion of reinforcing member 20 and may be used in attaching reinforcing member 20 to connection assembly 25. Reinforcing member 20 may be embedded in material 15 and may be connected to structural member 10 by connection assembly 25. Reinforcing member 20 may stabilize structural system 5 by extending back from structural member 10 into material 15. Reinforcing member 20 may be, for example, a soil reinforcing member.

Member 30 may be any suitable member for reinforcing structural system 5. For example, member 30 may be a soil reinforcing member. Member 30 may include any suitable material for reinforcing structural system 5. For example, member 30 may be a metallic material. Member 30 may be a material that is subject to corrosion. Member 30 may be, for example, a steel material. For example, member 30 may include carbon steel, high strength low alloy steel, low alloy steel, and/or any other suitable type of structural carbon steel. Member 30 may also include alloy steel, tool steel, stainless steel, and/or any other suitable type of structural alloy steel. Member 30 may include a structural steel such as mild steel including A36 or A50 steel, or high strength steel such as prestressing steel. Member 30 may also include structural metals such as, for example, aluminum, iron, tin, copper, nickel, lead, and/or any other metal suitable for use as reinforcing metal. Member 30 may be a hybrid material that includes metallic and non-metallic components. It is also contemplated that member 30 may be a nonmetallic material such as a plastic, polymeric, or other suitable nonmetallic material for use as a reinforcing material. Member 30 may be galvanized by any suitable galvanization method. Member 30 may be aluminized by any suitable aluminization method.

As illustrated in FIGS. 3-6, member 30 may be of any suitable dimensions for reinforcing structural system 5. For example, member 30 may have a length L of between about 6 feet and about 100 feet, between about 8 feet and about 50 feet, or between about 12 feet and about 25 feet. Also for example, member 30 may have a width W of between about 1.5 inches and about 6 inches, between about 2 inches and about 4 inches, or between about 2 inches and about 3 inches. Further for example, member 30 may have a thickness T1 of between about 1116 inch and about 1.0 inch, between about 3/32 inch and about 3/4 inch, or between about 1/8 inch and about 1/2 inch. Additionally for example, length L of member 30 may be greater than width W of member 30, and width W of member 30 may be greater than thickness T1 of member 30. Width W and thickness T1. of member 30 may be substantially constant along length L of member 30. Also, width W and/or thickness T1 of member 30 may vary along length L of member 30. As described further below, member 30 may be bent at two or more locations along length L.

Coating 35 may he any suitable coating for providing a protective layer over member 30. Coating 35 may be formed from any suitable material suitable for providing a protective coating that may provide strain compatibility with member 30. For example, coating 35 may be an elastomeric coating. For example, coating 35 may include a single component thermoplastic material. For example, coating 35 may be a material that is substantially entirely a polyurea material. Also for example, coating 35 may include a two-component thermoplastic material. For example, coating 35 may be a two-component aromatic thermoplastic material. For example, coating 35 may be a material including polyurethane and/or polyurea. For example, as further described in the exemplary method below, coating 35 may be formed from a spray-in-place elastomer such as, for example, a fast-cure spray thermoplastic polyurethane and/or polyurea.

Coating 35 may be a material having a tensile strength of between about 2,000 psi (lbs/in$^2$) and about 7,000 psi. Additionally for example, coating 35 may have a tensile strength of between about 2,500 psi and about 6,700 psi. Also for example, coating 35 may have a tensile strength of between about 2,000 psi and about 5,000 psi. Further for example, coating 35 may have a tensile strength of between about 4,500 psi and about 5,000 psi. A tensile strength of coating 35 may be measured, for example, according to ASTM D412 (American Society for Testing and Materials D412: Standard Test Methods for Vulcanized Rubber and Thermoplastic Elastomers-Tension). Also, for example, coating 35 may have a high shore D hardness allowing for desirable abrasion resistance.

Coating 35 may be a material having a tear strength (e.g., tear resistance) of between about 500 psi and about 1000 psi. Also for example, coating 35 may have a tear strength of between about 700 psi and about 1000 psi. Additionally for example, coating 35 may have a tear strength of between about 750 psi and about 950 psi. Also for example, coating 35 may have a tear strength of between about 800 psi and about 900 psi. Further for example, coating 35 may have a tear strength of between about 850 psi and about 900 psi. A tear strength of coating 35 may be measured, for example, according to ASTM D624 (American Society for Testing and Materials D624: Standard Test Method for Tear Strength of Conventional Vulcanized Rubber and Thermoplastic Elastomers).

Coating 35 may be a material having an elongation that may provide strain compatibility between member 30 and coating 35. Coating 35 may have an elongation property that is greater than relatively brittle materials such as, for example, epoxy. Also, coating 35 may have an elongation property that is greater than other coating materials such as, for example, zinc and aluminum. For example, coating 35 may be a material having an elongation of between about 75% and about 700%. Also for example, coating 35 may have an elongation of between about 90% and about 600%. Further for example, coating 35 may have an elongation of between about 300% and about 600%. Additionally for example, coating 35 may have an elongation of between about 450% and about 650%. Also for example, coating 35 may have an elongation of between about 500% and about 600%. Further for example, coating 35 may have an elongation of between about 550% and about 600%. Member 30 may have an elongation that is equal to or less than the elongation of coating 35, so that strain compatibility may exist between member 30 and coating 35 as described below. For example, member 30 may experience strains of between about 1% and 3%, which may be significantly less than strains that coating 35 may be capable of experiencing, based on its elongation properties. An elongation of coating 35 may be measured, for example, according to ASTM D412 (American Society for Testing and Materials D412: Standard Test Methods for Vulcanized Rubber and Thermoplastic Elastomers—Tension).

Coating 35 may be a material having a di-electric strength of between about 200 and about 400 V/mil. Also for example, coating 35 may have a di-electric strength of between about 200 and about 350 V/mil. Further for example, coating 35 may have a di-electric strength of between about 240 and about 320 V/mil. Additionally for example, coating 35 may have a di-electric strength of between about 250 and about 300 V/mil. A di-electric strength of coating 35 may be measured, for example, according to ASTM D149 (American Society for Testing and Materials D149: Standard Test Method for Dielectric Breakdown Voltage and Dielectric Strength of Solid Electrical Insulating Materials at Commercial Power Frequencies).

Figure 3:
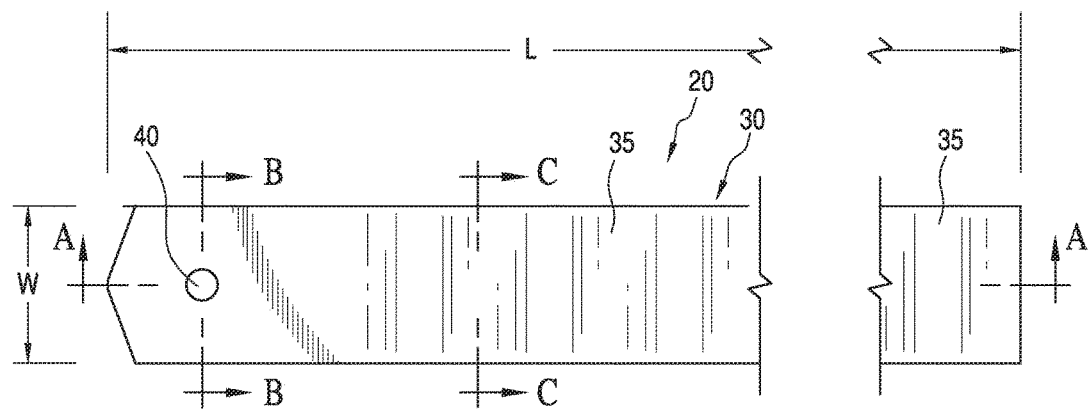
FIG. 3 is a plan view of an exemplary reinforcing member.
Figure 4:
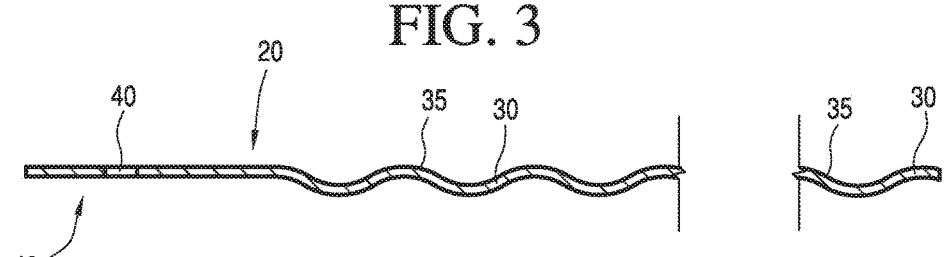
FIG. 4 is a sectional view taken through section A-A of the exemplary reinforcing member shown in FIG. 3.
Figure 5:
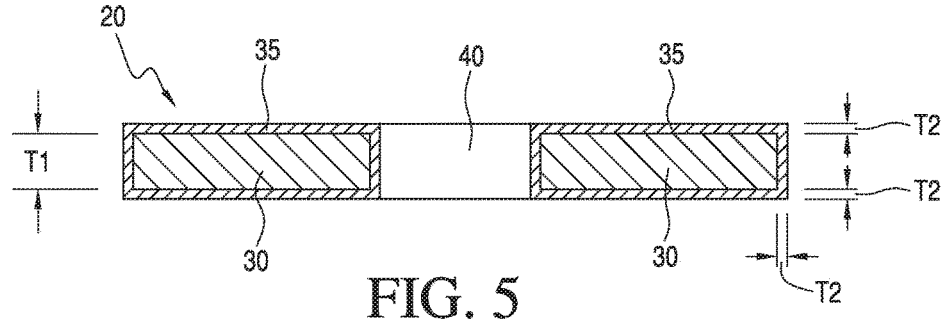
FIG. 5 is a sectional view taken through section B-B of the exemplary reinforcing member shown in FIG. 3.
Figure 6:
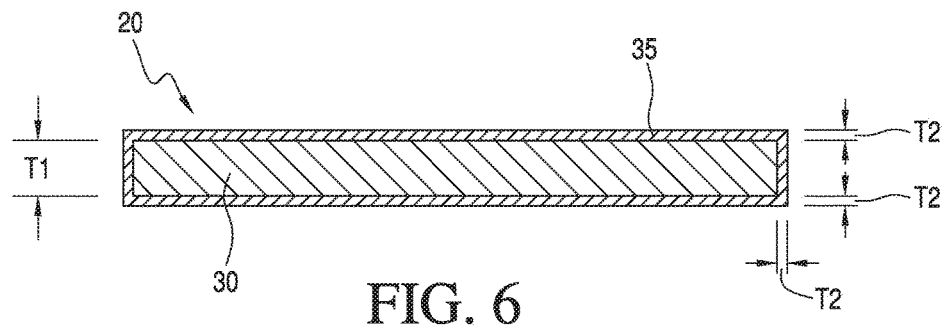
FIG. 6 is a sectional view taken through section C-C of the exemplary reinforcing member shown in FIG. 3.
Figure 8:
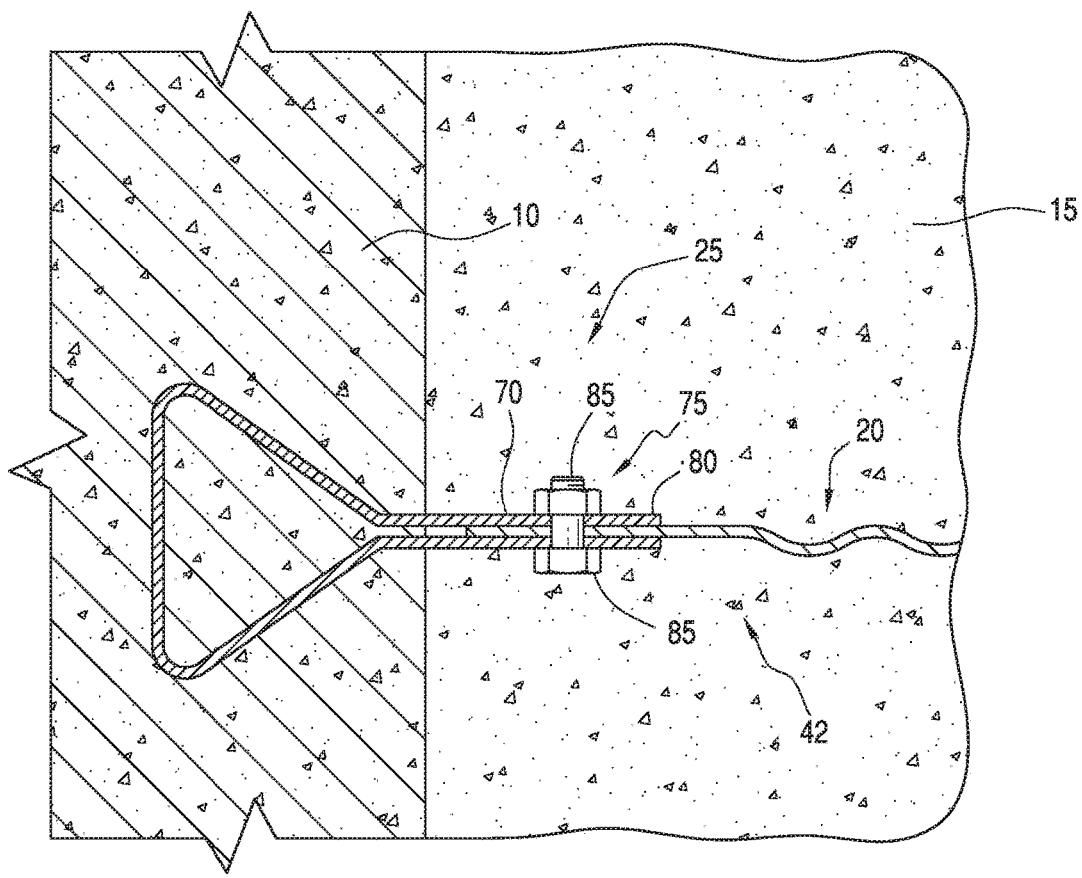
FIG. 8 is a sectional view of an exemplary connection assembly.
Figure 9:
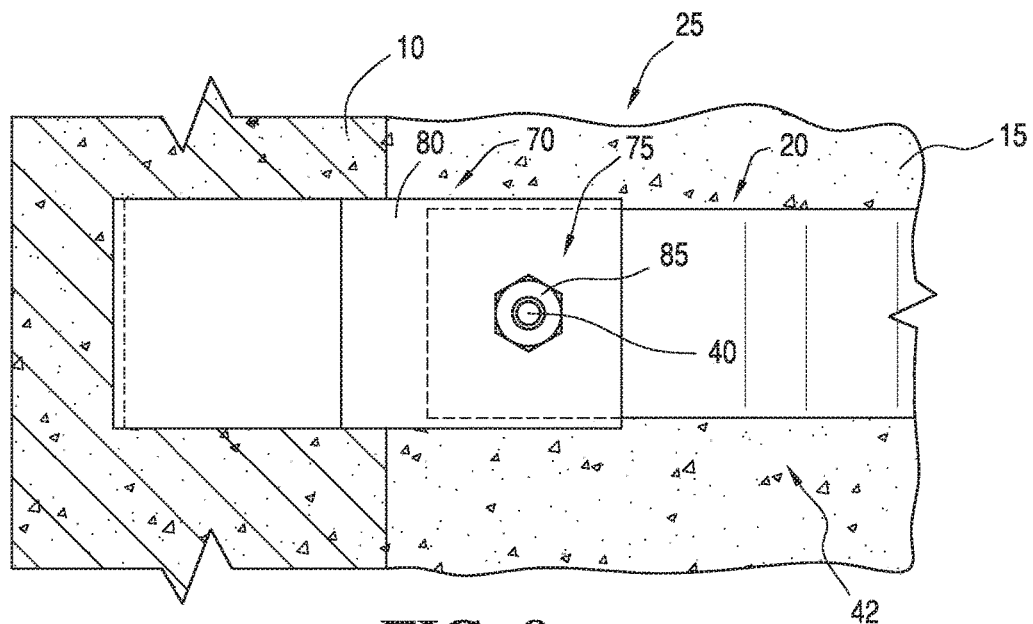
FIG. 9 is a plan view of the exemplary connection assembly.

As illustrated in FIGS. 3-6, coating 35 may have any suitable thickness for providing a protective coating for member 30. For example, coating 35 may have a thickness T2 of between about 10 mils (e.g., about 0.254 mm) and about 100 mils (e.g., about 2.54 mm). Also for example, coating 35 may have thickness T2 of between about 20 mils (e.g., about 0.508 mm) and about 80 mils (e.g., about 2.032 mm). Further for example, coating 35 may have thickness T2 of between about 20 mils (e.g., about 0.508 mm) and about 60 mils (e.g., about 1.524 mm). Additionally for example, coating 35 may have thickness T2 of between about 30 mils (e.g., about 0.762 mm) and about 50 mils (e.g., about 1.27 mm). Also for example, coating 35 may have thickness T2 of between about 40 mils (e.g., about 1.016 mm) and about 60 mils (e.g., about 1.524 mm). Thickness T2 of coating 35 may be a substantially uniform thickness. Also, thickness T2 of coating 35 may vary along length L and/or width W of member 30. For example, thickness T2 of coating 35 may be relatively thicker at an end portion 42 (e.g., as illustrated in FIGS. 4, 8, and 9) of reinforcing member 20, as compared to other portions of reinforcing member 20. For example, thickness T2 may be thicker at end portion 42 (which may be a first end portion) relative to other portions of reinforcing member 20, and thickness T2 may decrease in thickness along a length of reinforcing member 20 in a direction moving away from end portion 42.

Any suitable ratio between thicknesses and T2 may be provided for reinforcing member 20. Thickness T1 of member 30 may be, for example, between about 2 times and about 125 times greater than thickness T2 of coating 35. Also for example, thickness T1 may be, for example, between about 5 times and about 100 times greater than thickness T2, or between about 10 times and about 50 times greater than thickness T2. It is also contemplated that thickness T1 may be, for example, about the same size as thickness T2, or that thickness T1 may be, for example, less than thickness T2.

Coating 35 may include a material similar to LINE-X protective coatings available from LINE-X, LLC. Also, for example, coating 35 may include a material similar to Speedliner® available from Bearcat Industries, L.P. Further, for example, coating 35 may include a material similar to Rhino Extreme™ 11-50 GT available from Rhino Linings Corporation.

Coating 35 may be a protective coating that substantially prevents corrosion of member 30. Coating 35 may be applied to substantially all surfaces of member 30 and may thereby cover substantially the entire member 30. Coating 35 may thereby completely encapsulate member 30. Coating 35 may thereby provide a protective coating for substantially all surfaces of member 30. Accordingly, design thickness T1 of member 30 may be reduced because substantially no additional material to account for corrosion over a service life of reinforcing member 20 is appropriate. Accordingly, coating 35 may allow for a decreased thickness T1 of member 30 to be used. It is also contemplated that only some surfaces of member 30 may be coated with coating 35 so that member 30 may be partially encapsulated by coating 35.

Figure 7:
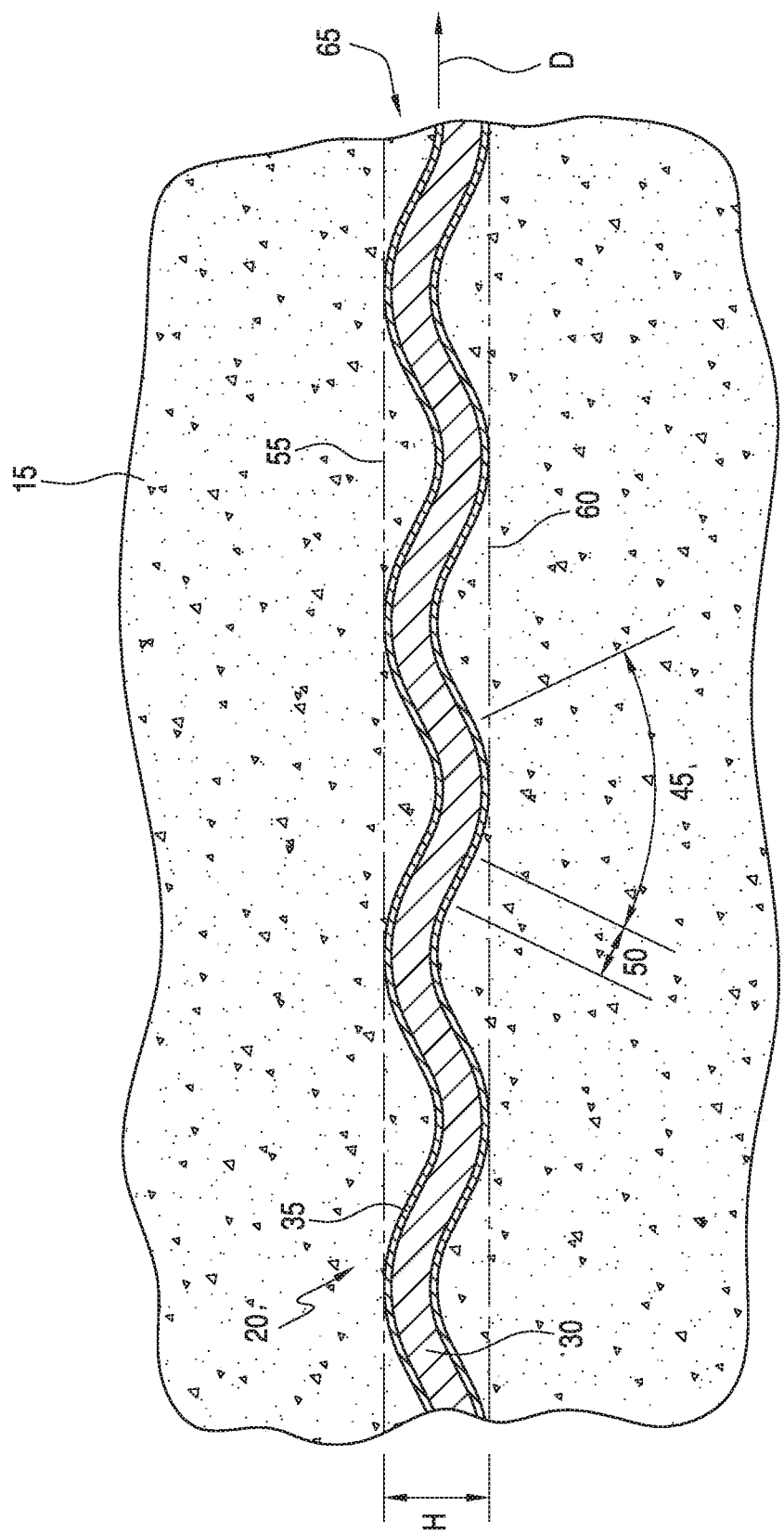
FIG. 7 is a sectional view of the exemplary reinforcing member.

As illustrated in FIG. 7, member 30 maybe bent at two or more locations along length L and/or width W so that reinforcing member 20 includes a plurality of curved segments 45 and substantially straight tangential segments 50. Curved segments 45 may allow reinforcing member 20 to develop increased resistance with a portion of material 15 disposed between crest lines 55 and 60. Crest lines 55 and 60 may be disposed between outermost surfaces of curved segments 45 as illustrated in FIG. 7. Portion 65 of material 15 disposed between crest lines 55 and 60 may be restrained in a load direction D and act integrally with reinforcing member 20. A friction force between portion 65 and reinforcing member 20 may be increased, because an apparent surface contact area and coefficient of friction between the particles of material 15 disposed in portion 65 and reinforcing member 20 are increased, based on the configuration of portion 65 having a height H. Further, coating 35 may have a relatively rough surface that may increase frictional resistance between material 15 and reinforcing member 20, increasing a resistance of reinforcing member 20 from pull-out from material 15.

As illustrated in FIGS. 4 and 7, reinforcing member 20 may be an elongated inextensible element that may be shaped into a nonlinear element so that axial tension may be resisted by flexure in portions of reinforcing member 20 instead of direct linear stress. As illustrated in FIGS. 4 and 7 and as further illustrated in the exemplary embodiments disclosed below, reinforcing member 20 may have a nonlinear shape such as, for example, a sine curve, a series of zigzags, a series of tangents and curves, and/or a spiral in any plane. As load is applied to reinforcing member 20 in direction D, reinforcing member 20 may elongate as a function of a configuration-material relationship. This additional extensibility allows the portion 65 of material 15 to develop increased shear strength and may reduce the load in reinforcing member 20. Also, as load is applied, the configuration of reinforcing member 20 may transfer the load into the surrounding portions of material 15 by both friction and passive soil resistance (e.g., the passive resistance being a function of the geometry of reinforcing member 20). After elongating, reinforcing member 20 may remain at a desirable stress.

As illustrated in FIGS. 8 and 9, connection assembly 25 may be any suitable connection for making a mechanical connection between structural member 10 and reinforcing member 20. Connection assembly 25 may include a member 70 and a fastener 75. Fastener 75 may mechanically fasten reinforcing member 20 to member 70.

Member 70 may be any suitable member for connecting structural member 10 and reinforcing member 20. Member 70 may be formed from a material that is similar to member 30 of reinforcing member 20. Member 70 may be coated with a coating 80 that may be similar to coating 35 of reinforcing member 20. Coating 80 may cover some or substantially the entire member 70. Member 70 may be attached to structural member 10 by any suitable method. For example, member 70 may be mechanically attached to structural member 10 or may be inserted into structural member 10 prior to structural member 10 being cast (e.g., when structural member 10 is a cast member). For example, member 70 may be coated with coating 80 and embedded in structural member 10 (e.g., that is a precast concrete member or cast-in-place concrete member) prior to hardening of structural member 10. As illustrated in FIGS. 8 and 9, member 70 may include apertures that may be aligned with aperture 40 of reinforcing member 20.

Fastener 75 may be any suitable mechanical fastener for fastening member 70 and reinforcing member 20. For example, fastener 75 may be a threaded bolt assembly including a threaded nut and a threaded bolt that may be inserted through aperture 40 of reinforcing member 20 and apertures of member 70 (e.g., as illustrated in FIG. 8). Fastener 75 may be coated with a coating 85 that may be similar to coating 35. Coating 85 may cover some or substantially the entire fastener 75. For example, coatings 80 and 85 may cover substantially all surfaces of connection assembly 25. As illustrated in FIGS. 8 and 9, fastener 75 may provide a mechanical connection between member 70 and reinforcing member 20 by utilizing apertures of member 70 and aperture 40 of reinforcing member 20. Fastener 70 may also be any other suitable fastener such as, for example, a clamping device. It is also contemplated that member 70 and reinforcing member 20 may be attached by adhesive, welding, or any other suitable method for attaching structural members.

As disclosed above, thickness T2 of coating 35 may be relatively thicker at end portion 42 of reinforcing member 20 disposed at or near connection assembly 25, as compared to other portions of reinforcing member 20. Coatings 80 and 85 may be of a similar thickness as thickness T2 at end portion 42 of reinforcing member 20. For example, because end portion 42 and connection assembly 25 may be located at a zone of maximum stress of structural system 5 (e.g., along a boundary between an active and resistant zone in the case where structural system 5 is an MSE wall), coatings 35, 80, and 85 may have relatively greater thicknesses at this location of relatively greater stress. Also for example, thickness T2 may decrease in thickness along a length of reinforcing member 20 in a direction moving away from end portion 42 and connection assembly 25.

Figure 10:
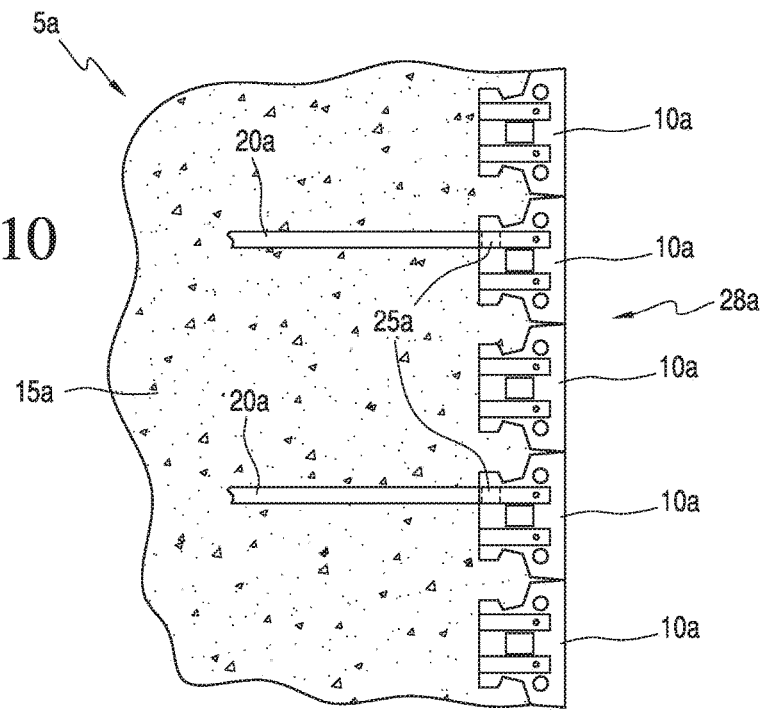
FIG. 10 is a plan view of a first additional exemplary embodiment of an exemplary structural system.
Figure 11:
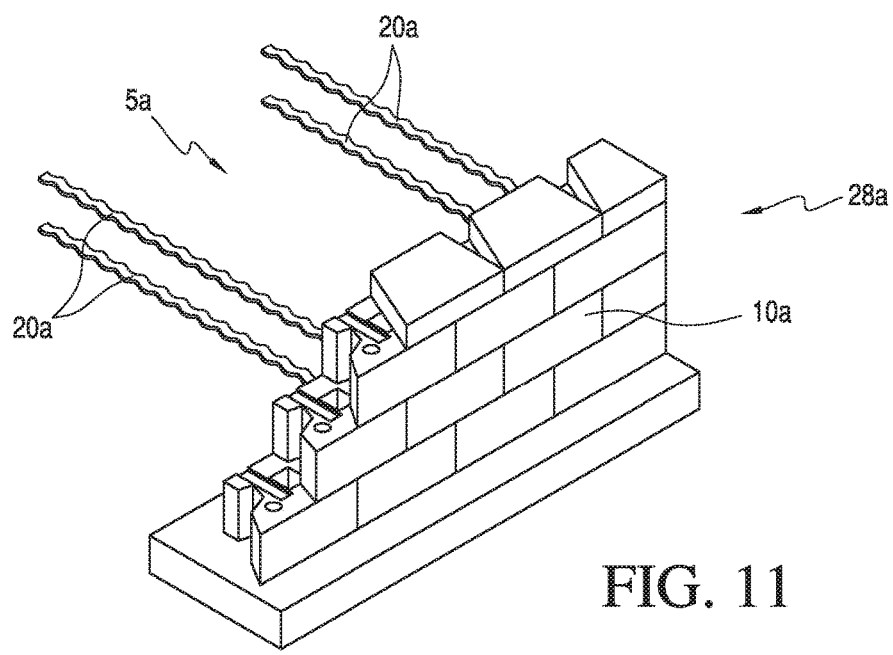
FIG. 11 is a schematic illustration of the first additional exemplary embodiment of an exemplary structural system.

FIGS. 10 and 11 illustrate a first additional exemplary embodiment of the disclosed structural system. Structural system 5a may include one or more structural members 10a, material 15a, one or more reinforcing members 20a, and one or more connection assemblies 25a. Structural members 10a may support material 15a. Reinforcing members 20a may be disposed in material 15a, which may be similar to material 15, and may reinforce structural system 5a by supporting structural member 10a. Reinforcing members 20a may be similar to reinforcing member 20. Connection assembly 25a may be similar to connection assembly 25 and may connect structural member 10a and reinforcing member 20a.

As illustrated in FIGS. 10 and 11, structural members 10a may form a block fascia unit 28a. Structural members 10a may be similar to structural members 10. Reinforcing members 20a may be attached to some structural members 10a via connection assemblies 25a. It is also contemplated that reinforcing members 25a may be attached to substantially all structural members 10a via connection assemblies 25a. Structural members 10a may be any suitable modular structural system for supporting material 15a. For example, structural members 10a may be reinforced precast concrete panels. As illustrated in FIG. 11, structural members 10a may be of substantially similar configurations and/or variable configurations to facilitate assembly of block fascia unit 28a.

Figure 12:
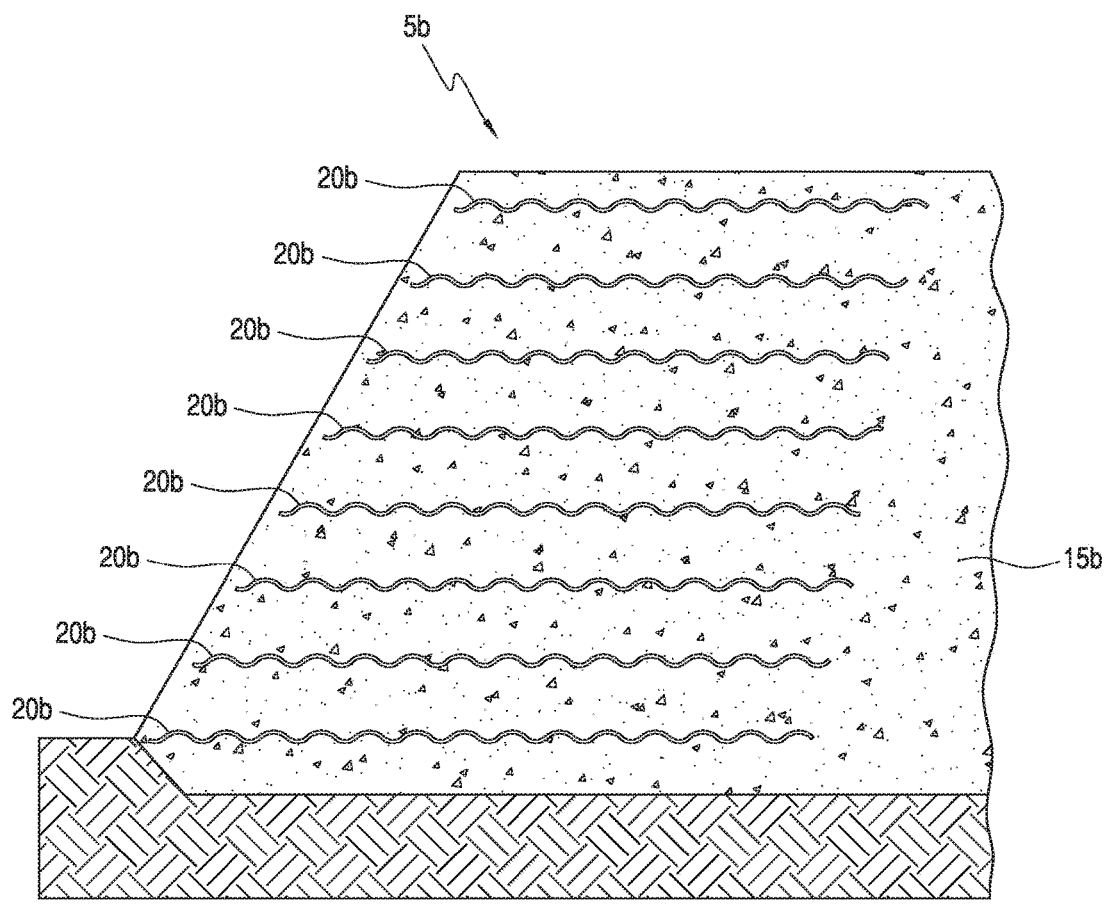
FIG. 12 is a sectional view showing a second additional exemplary embodiment of an exemplary structural system.

FIG. 12 illustrates a second additional exemplary embodiment of the disclosed structural system. Structural system 5b may include material 15b and one or more reinforcing members 20b. Reinforcing members 20b may be disposed in material 15b and may support material 15b, which may be similar to material 15. Reinforcing members 20b may be similar to reinforcing member 20. As illustrated in FIG. 12, reinforcing members 20b may support material 15b by being disposed in material 15b, without inclusion of additional structural members and connection assemblies. It is also contemplated that structural system 5b may include fascia structural members and/or connection assemblies.

Figure 13:
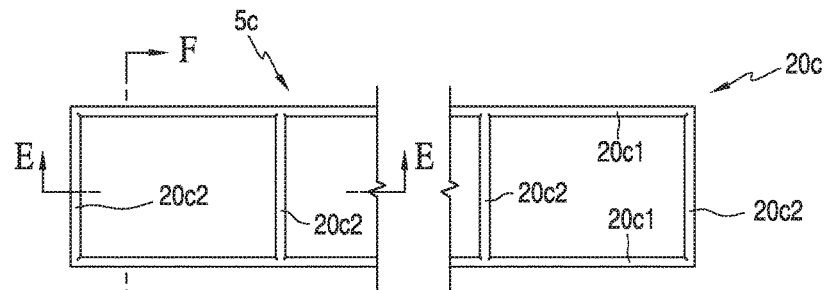
FIG. 13 is a plan view of a third additional exemplary embodiment of an exemplary structural system.
Figure 14:
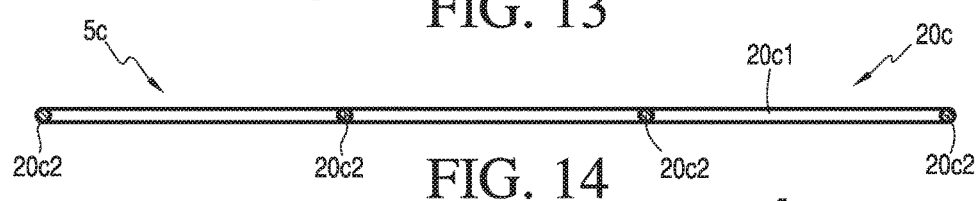
FIG. 14 is a sectional view taken through section E-E of the third additional exemplary embodiment shown in FIG. 13.
Figure 15:
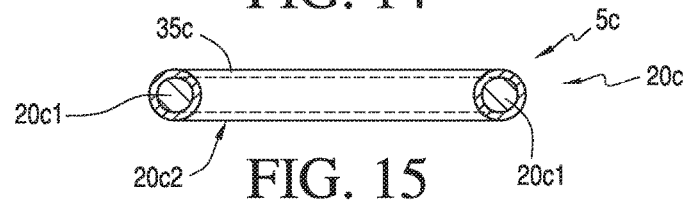
FIG. 15 is a sectional view taken through section F-F of the third additional exemplary embodiment shown in FIG. 13.

FIGS. 13-15 illustrate a third additional exemplary embodiment of the disclosed structural system. Structural system 5c may include one or more structural members (not shown, may be similar to structural member 10), material (not shown, may be similar to material 15), one or more reinforcing members 20c, and one or more connection assemblies (not shown, may be similar to connection assembly 25).

As illustrated in FIGS. 13-15, reinforcing member 20c may include members 20c1 and 20c2, that may be formed from material similar to member 30. Members 20c1 and 20c2 may be coated similarly to member 30, with a coating 35c that may be similar to coating 35. Reinforcing member 20c may be a grid-like or built-up reinforcement assembly. For example, reinforcing member 20c may be welded wire reinforcement, and members 20c1 and 20c2 may be reinforcing bars.

Figure 16:
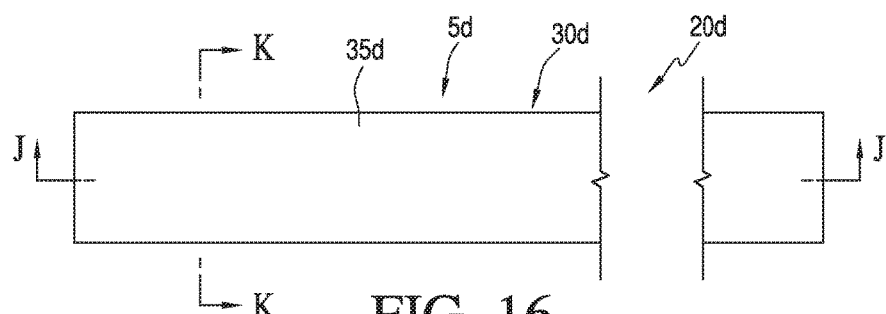
FIG. 16 is a plan view of a fourth additional exemplary embodiment of an exemplary structural system.
Figure 17:
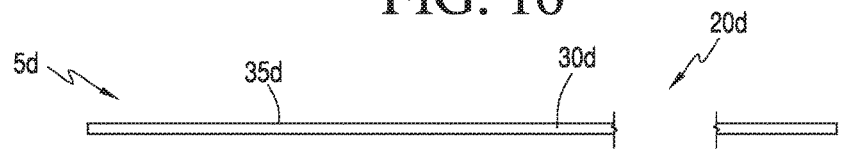
FIG. 17 is a sectional view taken through section J-J of the fourth additional exemplary embodiment shown in FIG. 16.
Figure 18:
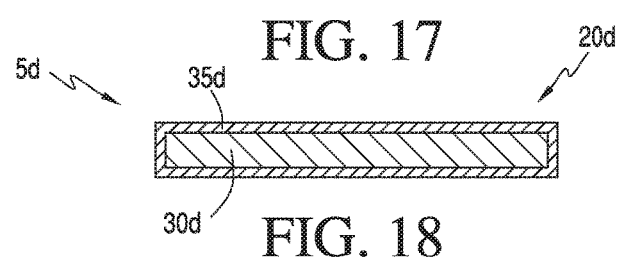
FIG. 18 is a sectional view taken through section K-K of the fourth additional exemplary embodiment shown in FIG. 16.

FIGS. 16-18 illustrate a fourth additional exemplary embodiment of the disclosed structural system. Structural system 5d may include one or more structural members (not shown, may be similar to structural member 10), material (not shown, may be similar to material 15), one or more reinforcing members 20d, and one or more connection assemblies (not shown, maybe similar to connection assembly 25).

As illustrated in FIGS. 16-18, reinforcing member 20d may include a member 30d that may be formed from material similar to member 30. Member 30d may be coated similarly to member 30, with a coating 35d that may be similar to coating 35. Reinforcing member 20d may be a substantially flat member having substantially no bends or curves. For example, reinforcing member 20d may be a substantially flat plate member.

Figure 19:
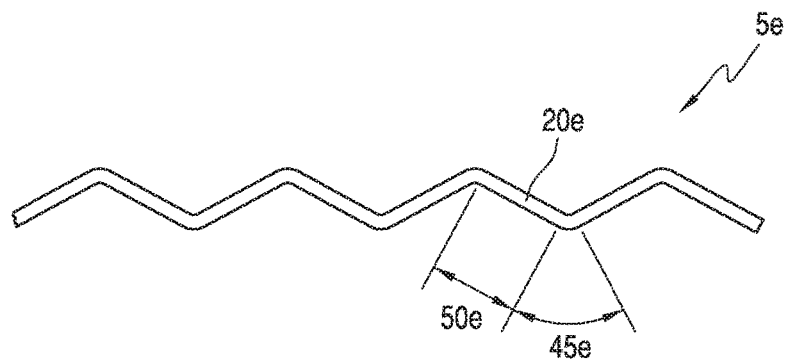
FIG. 19 is a sectional view of a fifth additional exemplary embodiment of an exemplary structural system.

FIG. 19 illustrates a fifth additional exemplary embodiment of the disclosed structural system. Structural system 5e may include one or more structural members (not shown, may be similar to structural member 10), material (not shown, may be similar to material 15), one or more reinforcing members 20e, and one or more connection assemblies (not shown, may be similar to connection assembly 25).

Reinforcing member 20e may be similar to reinforcing member 20. Reinforcing member 20e may include a plurality of bent segments 45e and substantially straight tangential segments 50e. Bent segments 45e may be relatively sharp bends in reinforcing member 20e. The plurality of bent segments 45e and substantially straight tangential segments 50e may develop increased resistance as discussed above with reference to curved segments 45 and tangential segments 50.

Figure 20:
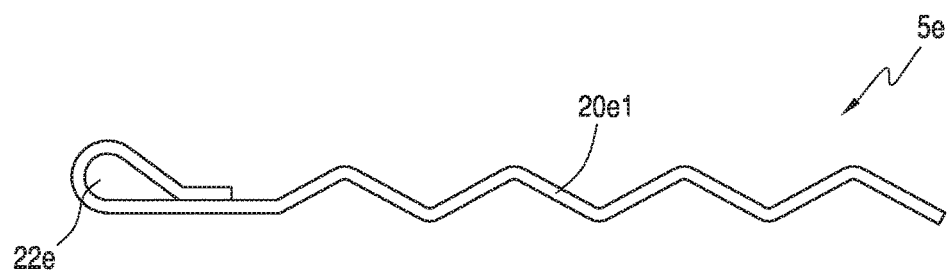
FIG. 20 is a sectional view of a first alternative embodiment of the fifth additional exemplary embodiment.

FIG. 20 illustrates a first alternative embodiment of the fifth exemplary embodiment. As illustrated in FIG. 20, a reinforcing member 20e1 is looped to form an aperture 22e. Aperture 22e may serve a purpose that is similar to aperture 40, described above.

Figure 21:
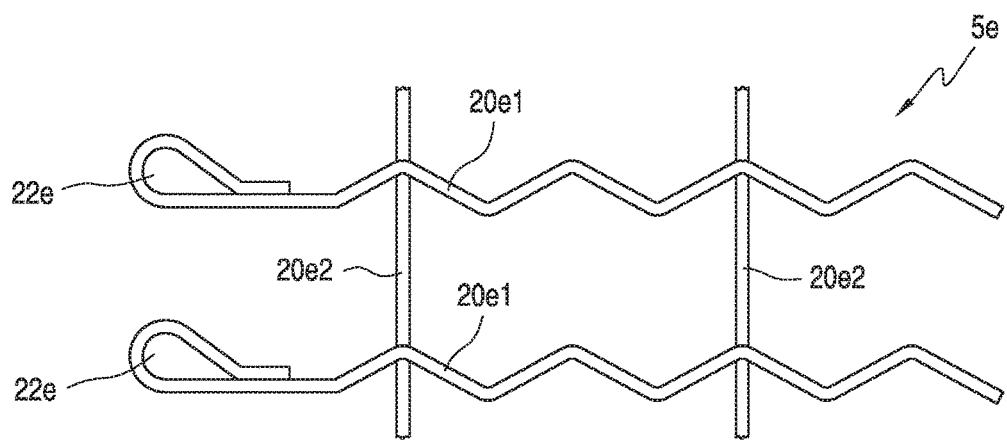
FIG. 21 is a sectional view of a second alternative embodiment of the fifth additional exemplary embodiment.

FIG. 21 illustrates a second alternative embodiment of the fifth exemplary embodiment. As illustrated in FIG. 21, reinforcing members 20e1 are looped to form apertures 22e. As illustrated in FIG. 21, reinforcing members 20e1 may be attached to transverse reinforcing members 20e2 to form a grid pattern such as, for example, a welded wire mat.

Figure 22:
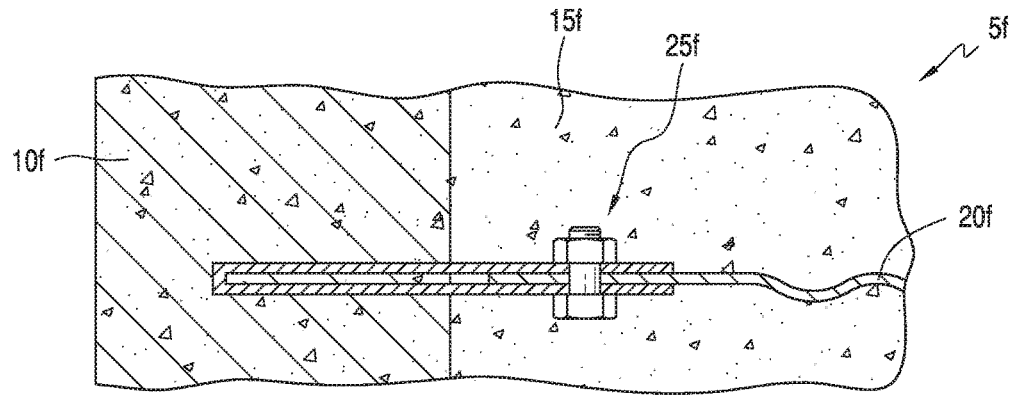
FIG. 22 is a sectional view of a sixth additional exemplary embodiment of an exemplary structural system.

FIG. 22 illustrates a sixth additional exemplary embodiment of the disclosed structural system. Structural system 5f may include one or more structural members 10f (may be similar structural member 10), material 15f (may be similar to material 15), one or more reinforcing members 20f (may be similar to reinforcing member 20), and one or more connection assemblies 25f.

Connection assembly 25f may be formed from similar materials as connection assembly 25 and may be coated similarly to connection assembly 25. As illustrated in FIG. 22, connection assembly 25f may include a connector that is partially embedded in structural member 10f and that has a mechanical fastener (e.g., a pin or a bolt) that extends through the embedded connector and reinforcing member 20f, thereby forming a connection.

Figure 23:
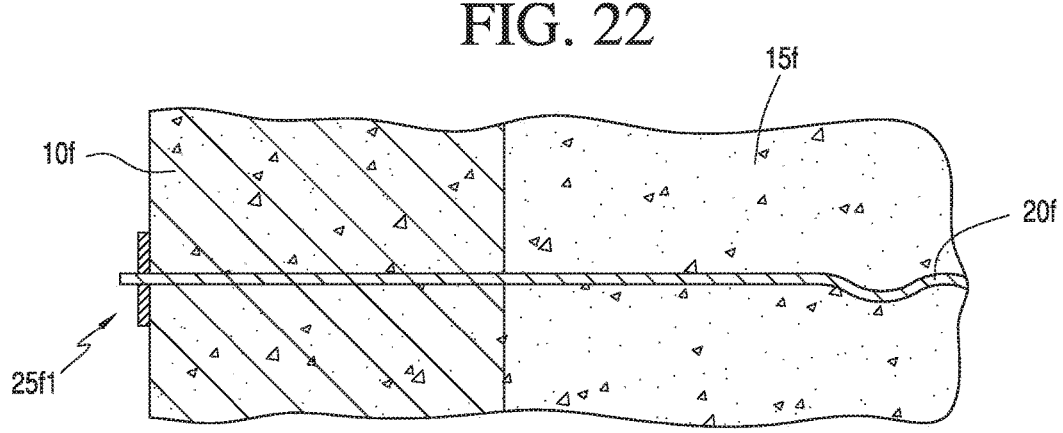
FIG. 23 is a sectional view of a first alternative embodiment of the sixth additional exemplary embodiment.

FIG. 23 illustrates a first alternative embodiment of the sixth exemplary embodiment. As illustrated in FIG. 23, reinforcing member 20f may extend through structural member 10f. Connection assembly 25f1 may be a fastener such as a pin or bolt that extends through an aperture in reinforcing member 20f and along an outer surface of structural member 10f, thereby forming a connection. Connection assembly 25f1 may be formed from similar materials as connection assembly 25 and may be coated similarly to connection assembly 25

Figure 24:
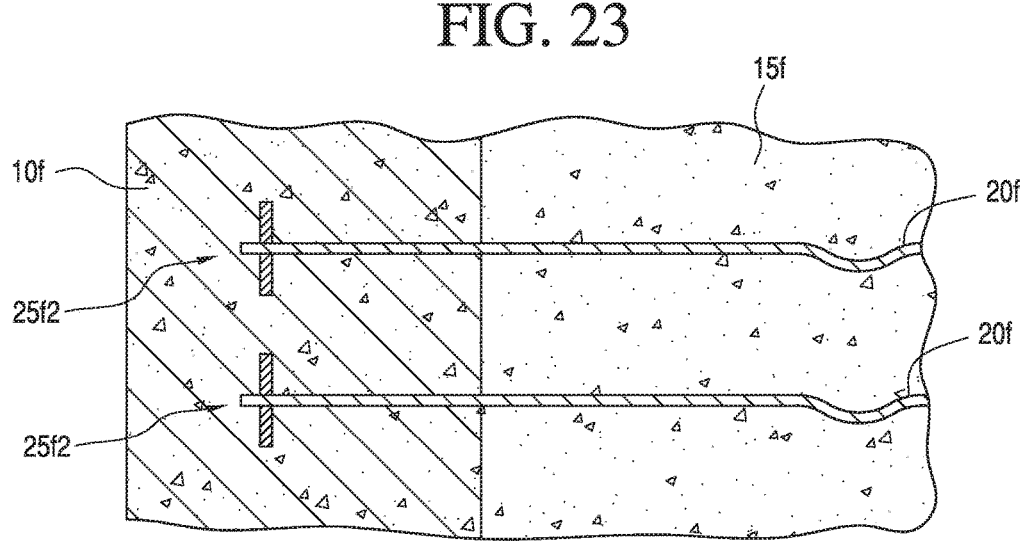
FIG. 24 is a sectional view of a second alternative embodiment of the sixth additional exemplary embodiment.

FIG. 24 illustrates a second alternative embodiment of the sixth exemplary embodiment. Connection assembly 25f2 may be similar to connection assembly 25f1 and may be disposed inside of structural member 10f.

Wherever appropriate, features of any of the above disclosed exemplary embodiments may be utilized with any other of the above disclosed exemplary embodiments.

INDUSTRIAL APPLICABILITY

The exemplary disclosed system and method may be used in any application involving providing a protective coating of reinforcement material. For example, the disclosed structure and method may be used in applications involving construction and/or structural systems having metallic reinforcement that is exposed to corrosion. Also for example, the exemplary disclosed system may be used in a mechanically stabilized earth (MSE) structural system such as an MSE wall. Further for example, the exemplary disclosed system and method may be used in areas having corrosive soil, exposed to chemical deicing, and/or disposed at or near a tidal water areas or areas having ground water. Additionally for example, the exemplary disclosed system may be used in a structural system disposed on land, a marine structural system, or a coastal structural system. Further for example, the exemplary disclosed system may be used in a structural system disposed in or near a non-aggressive soil that may cause corrosion after a relatively long period of time.

Figure 25:
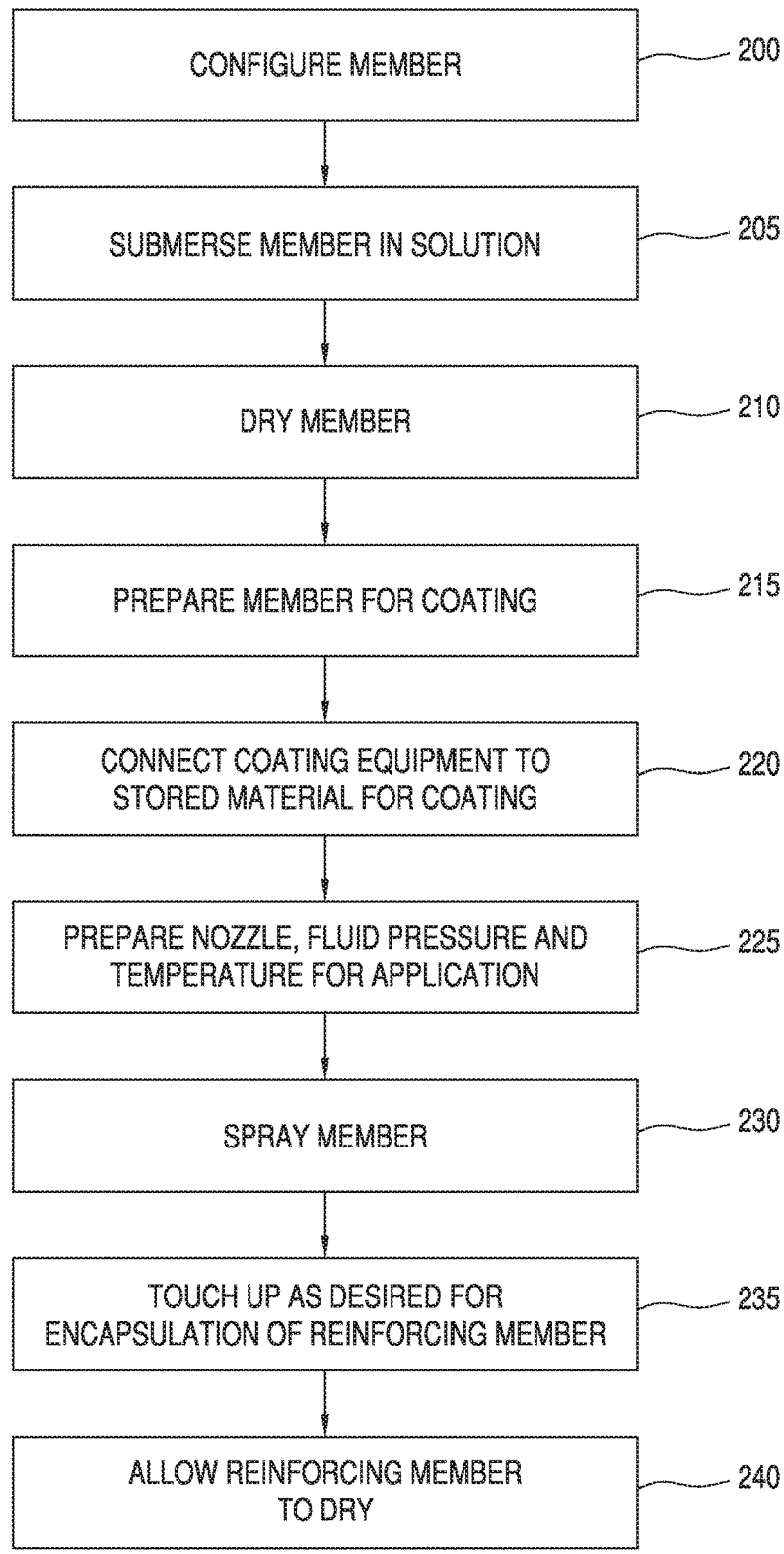
FIG. 25 is a flow chart for an exemplary method for providing a protective coating on a member.

FIG. 25 illustrates an exemplary disclosed method for providing a protective coating on a member. Structural system 5, illustrated in FIGS. 1-9, will be used as an exemplary embodiment to illustrate the exemplary disclosed construction method, though any of the disclosed exemplary embodiments may be used to illustrate the exemplary method for providing a protective coating on a member. The exemplary disclosed method for providing a protective coating on a member may be used, for example, in conjunction with any of the exemplary embodiments described above.

In step 200, member 30 is configured. For example, member 30 may be shaped in a desired form as illustrated, e.g., in FIGS. 3 and 4. For example, member 30 may be bent at two or more locations along a length of member 30, thereby bending member 30 at a plurality of locations along the length of member 30. Member 30 may also be punched, for example, to provide aperture 40. Following shaping and punching, member 30 may be galvanized and/or aluminized by any suitable method. For example, steel strips or wires may be configured into a final geometry, then hot-dip galvanized in a bath of zinc to configure member 30.

Alternatively, for example, member 30 may be configured in any other suitable manner. For example, a steel coil may be dipped in a bath, slit, and then configured into a desired shape for member 30 (e.g., shaped and punched) as illustrated in FIGS. 3 and 4. For example, a sheet of steel coil may be dipped in a bath of pure aluminum, the steel coil may be slit, and the resulting steel strips (e.g., Aluminized Steel Type 2) may be configured into member 30 having a final, desired geometry. Members of reinforcing members 20a, 20b, 20c, 20d, 20e, and 20f may be similarly configured according to step 200.

Figure 26:
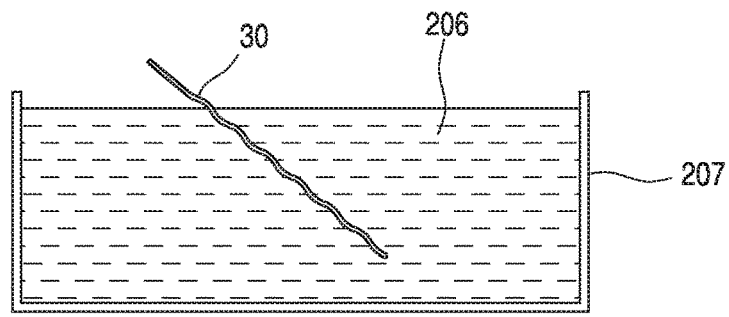
FIG. 26 is a schematic illustration of an exemplary step of submersion in a solution.

In step 205, member 30 is submersed in a solution. As illustrated in FIG. 26, member 30 may be submersed in a material 206 contained in a housing 207. Material 206 may be any suitable material for preparing member 30 for adhesion by removing scale and/or substantially preventing loss of a base material of member 30. For example, material 206 may be a pickling solution. Also for example, material 206 may include soluble organic and/or inorganic phosphorous-sulfur compounds. Member 30 may be partially or entirely substantially submersed in material 206. Members of reinforcing members 20a, 20b, 20c, 20d, 20e, and 20f may be similarly submersed according to step 205.

Figure 27:
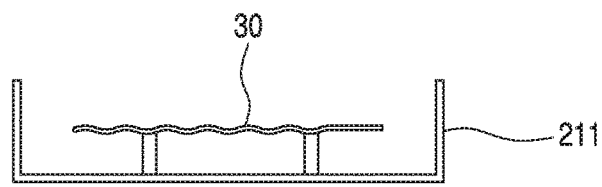
FIG. 27 is a schematic illustration of an exemplary drying step.

In step 210, member 30 is dried. Member 30 may be dried by any suitable method such as, for example, being dried by using a heating device, being dried by using a drying device, or being dried over time in ambient conditions. For example, as illustrated in FIG. 27, member 30 may be dried by using an infrared heater 211 to reduce drying time. Members of reinforcing members 20a, 20b, 20c, 20d, 20e, and 20f may be similarly dried according to step 210.

Figure 28:
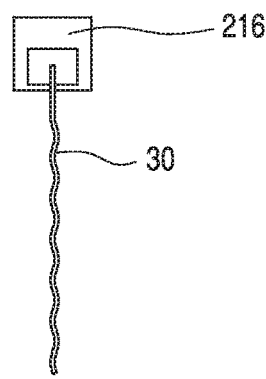
FIG. 28 is a schematic illustration of an exemplary preparing step.

In step 215, member 30 is prepared for coating. For example, after substantially all surfaces of member 30 are dry and have a substantially smooth, uniform finish (e.g., after steps 200, 205, and 210 are performed), member 30 may be suitably placed for coating. For example, member 30 may be laid out or hung for a coating method such as, for example, spraying. For example, as illustrated in FIG. 28, member 30 may be hung or suitably placed for coating. For example, member 30 may be prepared for coating by being hung from a device 216 such as, for example, a mechanical clamp, a device having a projection for receiving aperture 40, or any other suitable device on which member 30 may be placed in preparation for coating (e.g., a mount or other device for supporting member 30 from below). Members of reinforcing members 20a, 20b, 20c, 20d, 20e, and 20f may be similarly prepared according to step 215.

Figure 29:
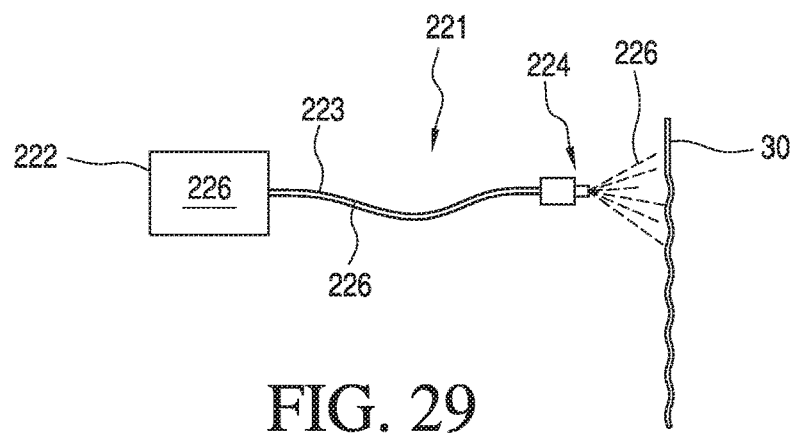
FIG. 29 is a schematic illustration of exemplary coating equipment.

In step 220, coating equipment is connected to stored material for coating. For example, as illustrated in FIG. 29, coating equipment 221 may be connected to stored material housing 222 that may be any suitable housing for storing a coating material and may be a pressurized container. For example, coating equipment 221 may include a passageway 223 and a nozzle assembly 224, Passageway 223 may fluidly connect stored material housing 222 to nozzle assembly 224. Coating material 226 contained in housing 222 may thereby be transported from housing 222 to nozzle assembly 224 via passageway 223. Coating equipment 221 and housing 222 may store and transfer coating material 226 under pressure. Passageway 223 may be any suitable passageway for transferring coating material 226 such as, for example, a flexible hose and/or a heated hose. Nozzle assembly 224 may be any suitable device for placing coating material such as, for example, a spray nozzle for placing a pressurized coating material. For example, coating equipment 221 and housing 222 may provide substantially precise fluid pressure for coating material 226 suitable for providing coating 35 having desired coating mix, thickness, and polymerization. For example, coating equipment 221 may be a multiple component spray machine that internally mixes polyurethane. Coating material 226 includes materials corresponding to the materials described above for coating 35 (e.g., applying coating material 226 to member 30 provides coating 35 on member 30). Similar preparations may be made, e.g., for coatings 35c, 35d, 80, and 85.

In step 225, nozzle assembly 224, a fluid pressure of coating material 226, and a temperature of coating material 226 are prepared for application. An operator may operate coating equipment 221 and housing 222 to bring coating material 226 to a desired fluid pressure and temperature. An operator may also prepare nozzle assembly 224 to provide coating 35 having desired coating mix, thickness, and polymerization. Coating material 226 may be heated, for example, to between about 100 degrees and about 160 degrees, or to between about 120 degrees and about 140 degrees. Similar preparations may be made, e.g., for coatings 35c, 35d, 80, and 85.

In step 230, as illustrated for example in FIG. 29, member 30 is sprayed using coating equipment 221. Nozzle assembly 224 may mix components of coating material 226 at or near a tip of nozzle assembly 224, and dispense material 226 at high pressure to form coating 35. A desired coating may thereby be provided (e.g., as described above for coating 35 provided on member 30). For example, coating equipment 221 may be used to spray-coat member 30 with coating material 226 (e.g., elastomeric material) to provide coating 35. Reinforcing member 20 may be allowed to cure if appropriate. Also, for example, coating material 226 may dry rapidly to form coating 35 (e.g., dry in up to 5 or 10 seconds). Reinforcing members 20a, 20b, 20c, 20d, 20e, and 20f may be similarly prepared according to step 230.

In step 235, touchup work is performed if appropriate to facilitate encapsulation of reinforcing member 20. For example, additional coating material 226 may be applied to member 30 to facilitate substantially all surfaces of member 30 being sufficiently covered with coating 35. Reinforcing members 20a, 20b, 20c, 20d, 20e, and 20f may be similarly touched up according to step 235. Members of reinforcing members 20*a*, 20*b*, 20*c*, 20*d*, 20*e*, and 20*f* may thereby be completely or partially encapsulated by their respective coatings.

In step 240, reinforcing member 20 is allowed to dry. For example, reinforcing member 20 may be allowed to become substantially entirely dry. Reinforcing members 20*a*, 20*b*, 20*c*, 20*d*, 20*e*, and 20*f* may be similarly allowed to dry according to step 240. In the case in which, e.g., the respective coating of reinforcing members 20*a*, 20*b*, 20*c*, 20*d*, 20*e*, and 20*f* is an elastomeric material and the respective member of reinforcing members 20*a*, 20*b*, 20*c*, 20*d*, 20*e*, and 20*f* is a metallic material, an alloy layer between the coating and the member may not form (e.g., as in the case of zinc and aluminum coatings, in which case an alloy layer does form).

Reinforcing members 20, 20*a*, 20*b*, 20*c*, 20*d*, 20*e*, and 20*f* are disposed in material 15 (and respective material per the above exemplary embodiments, e.g., material 15*a*). As set forth above, reinforcing members 20 are connected to structural members 10 via connection assemblies 25 of structural system 5 (as well as other exemplary embodiments as set forth above, e.g., structural systems 5*a*, 5*c*, 5*d*, and/or 5*f*). The exemplary disclosed reinforcing members resist load in load direction D as illustrated in FIG. 7.

As reinforcing member 20 resists load in load direction D (e.g., as illustrated in FIG. 7), reinforcing member 20 transfers the load into the surrounding portions of material 15 by both friction and passive resistance (e.g., passive soil resistance) as described above. Also, as described above, reinforcing member 20 elongates based on its non-linear shape as load is resisted in load direction D, providing additional elasticity that allows portion 65 of material 15 to develop increased shear strength, which reduces the load in reinforcing member 20. Reinforcing members 20*a*, 20*b*, 20*c*, 20*e*, 20*e*1, and 20*f*, for example, may elongate similarly.

As described above, elongation properties of coating 35 provide it with strain compatibility with member 30. As member 30 is strained under load, coating 35 undergoes similar strain without fracture due to the elongation properties described above. Accordingly, reinforcing member 20 undergoes strain with strain compatibility between member 30 and coating 35. Reinforcing members 20*a*, 20*b*, 20*c*, 20*d*, 20*e*, 20*e*1, and 20*f*, for example, may experience similar strain compatibility.

Over a design life (e.g., or service life) of structural system 5 (e.g., a period of years, decades, or longer), coating 35 protects member 30 from corrosion. An initial cross section of member 30 is thereby maintained over the design life of structural system 5. For example, thickness of member 30 remains substantially constant over the design life of structural system 5, which maintains substantially constant strain and stress distribution across member 30, which may keep reinforcing member 20 substantially uniformly extensible throughout a service life of structural system 5. Coated members of reinforcing members 20*a*, 20*b*, 20*c*, 20*d*, 20*e*, 20*e*1, and 20*f* similarly maintain their initial cross sections. Additionally, the coated exemplary connection assemblies described above similarly maintain their initial cross sections.

Figure 30:
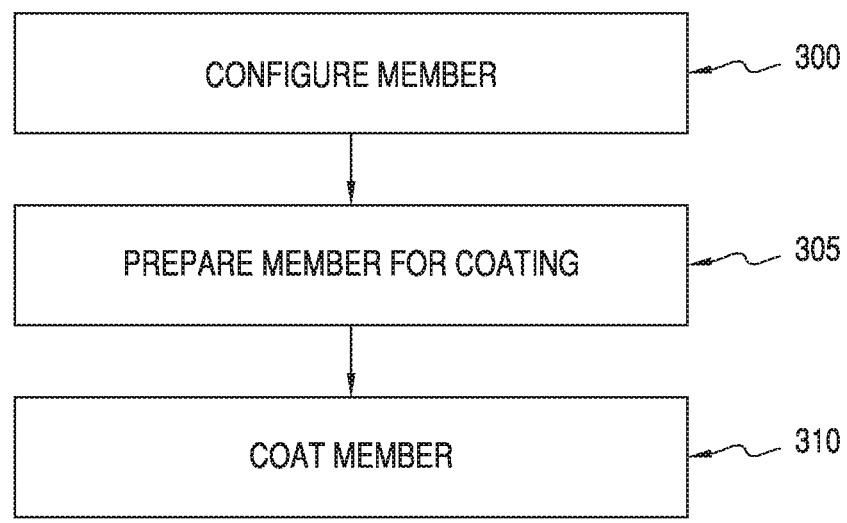
FIG. 30 is a flow chart for another exemplary method for providing a protective coating on a member.

FIG. 30 illustrates another exemplary disclosed method for providing a protective coating on a member, which may provide a protective coating using any suitable techniques. In step 300, a member is configured. The member may be configured in a similar manner as described above in step 200, or by any other suitable technique for configuring a reinforcing member. In step 305, a member is prepared for coating. The member maybe prepared in a similar manner as described above in step 215, or by any other suitable technique for preparing a reinforcing member for coating. In step 310, the member may be coated. The member may be coated in a similar manner as described above in step 230, or by any other suitable technique for coating a member such as, for example, by mechanically applying a coating or dipping the member into a coating material. For example, coating equipment 221 may include an apparatus for rolling a coating material onto a member to provide coating 35 on the member. Also for example, coating equipment 221 may include equipment that allows for a member to be coated by dipping the member into a coating material, thereby providing coating 35 onto the member.

In step 310, the member may be seamlessly encapsulated by the coating, In general, corrosion and metal loss may be a function of surface irregularity and differential aeration mechanisms on the member. When the coating encapsulates the member, the member may not be exposed to a material such as soil, which may substantially prevent surface irregularities, impurities in the material of the encapsulated member, and differential aeration that lead to material loss (e.g., micro-cells and electrical potential, which may lead to corrosion, are no longer present). These factors, which may break down material such as steel, zinc, and aluminum materials over time, may not be present. Further, when the member is encapsulated by the coating, macro-cells that may develop between the exemplary structural member and an end portion of the exemplary reinforcing member are no longer connected by a conduit (e.g., a steel conduit in the case in which the exemplary reinforcing member is metal such as steel). The encapsulated member thereby does not have a higher potential between pH differences in the material of the exemplary structural system (e.g., between a concrete fascia and soil backfill, when the exemplary structural system is an MSE wall). Accordingly, the coating electrically isolates the encapsulated member. Accordingly, coating the member (e.g., member 30 or any other exemplary member disclosed above) may include completely encapsulating the member with the coating (e.g., coating 35 or any other exemplary coating disclosed above).

Figure 31:
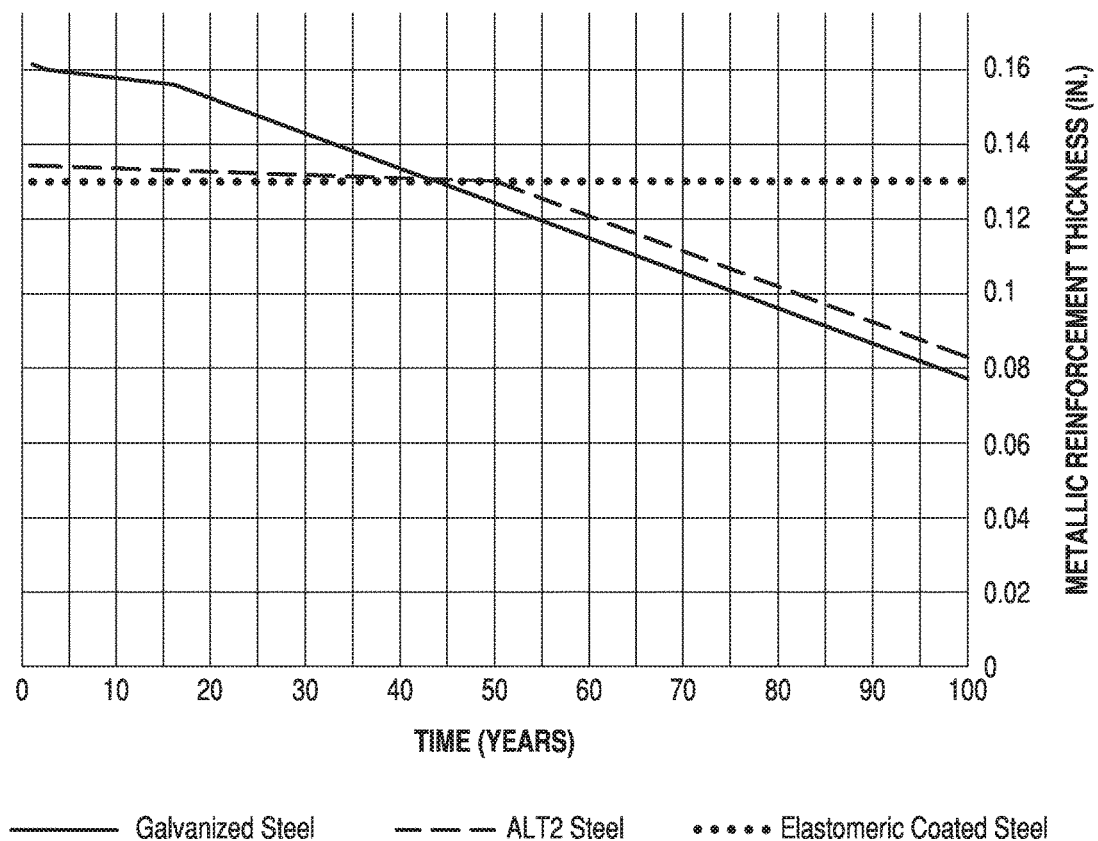
FIG. 31 is a graphical illustration of a corrosion rate of the exemplary reinforcing member compared to conventional corrosion rates.

FIG. 31 is a graph illustrating a corrosion rate of the exemplary reinforcing members compared to conventional corrosion rates. FIG. 31 illustrates how the thickness of conventional reinforcing members (e.g., as represented in the graph by Galvanized Steel and ALT2 Steel, as calculated according to design standards of the American Association of State Highway and Transportation Officials) decrease over a lifetime of conventional structures due to corrosion. In comparison, FIG. 31 shows how an example of the exemplary disclosed reinforcing members (e.g., elastomeric coating steel) experiences little or substantially no decrease in thickness due to corrosion.

The exemplary disclosed system and method may provide a protective coating that substantially prevents corrosion of reinforcing members over the service life of a structure. For example, the exemplary disclosed system may provide a method for delaying an onset of corrosion, allowing the use of relatively thin metallic elements as reinforcement for the design life of a structure, without using increased thicknesses of reinforcement to account for corrosion. Also for example, the exemplary disclosed system may provide connections between reinforcing members and fascia structural members that are corrosion-resistant. Further for example, the exemplary disclosed system may provide increased abrasion resistance for reinforcing members during handling and shipping.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A soil reinforcing member comprising:
a metallic member extending between a first end and a second end, the first end being engageable with a structural member, and the metallic member being deformable such that the metallic member elongates with a soil surrounding the soil reinforcing member; and
an elastomeric coating disposed on the metallic member to mitigate corrosion of a cross-sectional area of the metallic member;
wherein the elastomeric coating includes a dielectric strength sufficient to electrically isolate the metallic member from the soil, and an elongation equal to or greater than an elongation of the metallic member to mitigate cracking of the elastomeric coating upon elongation of the metallic member, such that the cross-sectional area of the metallic member is less than a cross-sectional area of an equivalent metallic soil reinforcing member without the elastomeric coating.

2. The soil reinforcing member of claim 1, wherein the coating includes polyurethane or polyurea.

3. The soil reinforcing member of claim 1, wherein the elastomeric coating has a tensile strength of between about 2,000 psi and about 5,000 psi.

4. The soil reinforcing member of claim 1, wherein the elastomeric coating has a tear strength of between about 500 pli and about 1000 pli.

5. The soil reinforcing member of claim 1, wherein the elastomeric coating has an elongation of between about 90% and about 600%.

6. The soil reinforcing member of claim 1, wherein the elastomeric coating has an elongation of between about 300% and 600% and the metallic member is designed to strain between about 1% and 3%, such that strain compatibility exists between the metallic member and the elastomeric coating.

7. The soil reinforcing member of claim 1, wherein the elastomeric coating has a di-electric strength of between about 200 V/mil and about 400 V/mil.

8. The soil reinforcing member of claim 1, wherein the elastomeric coating has a thickness of between about 10 mils and about 100 mils.

9. The soil reinforcing member of claim 1, wherein a thickness of the elastomeric coating is thicker at the first end of the metallic member, and the thickness of the elastomeric coating decreases along the length of the metallic member in a direction moving away from the first end.

10. The soil reinforcing member of claim 1, wherein an exterior surface of the elastomeric coating is configured to increase the frictional resistance between the soil reinforcing member and the soil.

11. The soil reinforcing member of claim 1, wherein the soil reinforcing member has a service life, and the cross-sectional area of the soil reinforcing member remains constant during at least a portion of the service life.

12. The soil reinforcing member of claim 11, wherein the first end of the metallic member is directly engageable with the structural member.

13. A method of producing a soil reinforcing member including a deformable metallic member extending between a first end and a second end, the method comprising:
bending the first end of the metallic member for engagement with a structural member; and
coating the metallic member with an elastomeric material to mitigate corrosion of a cross-sectional area of the metallic member,
wherein the elastomeric material includes a dielectric strength sufficient to electrically isolate the metallic member from the soil, and an elongation equal to or greater than an elongation of the metallic member to mitigate cracking of the elastomeric coating upon elongation of the metallic member, such that the cross-sectional area of the metallic member is less than a cross-sectional area of an equivalent metallic soil reinforcing member without the elastomeric coating.

14. The method of claim 13, wherein coating the metallic member includes completely encapsulating the metallic member with the coating.

15. The method of claim 13, wherein coating the metallic member includes spray-coating the metallic member with the elastomeric material.

16. The method of claim 13, further comprising galvanizing or aluminizing the metallic member.

17. A mechanically stabilized earth retaining system comprising;
a soil reinforcing member including a metallic member extending between a first end a second end;
a connection assembly at the first end of the metallic member; and
an elastomeric coating covering substantially the entirety of the metallic member to mitigate corrosion of a cross-sectional area of the metallic member;
a structural member engageable with the connection assembly of the soil reinforcing member to retain earth,
wherein the elastomeric coating includes a dielectric strength sufficient to electrically isolate the metallic member from the soil, and an elongation equal to or greater than an elongation of the metallic member to mitigate cracking of the elastomeric coating upon elongation of the metallic member.

18. The mechanically stabilized earth retaining system of claim 17, wherein the structural member is a concrete member.

19. The mechanically stabilized earth retaining system of claim 17, wherein the reinforcing member is welded wire reinforcement.

20. The mechanically stabilized earth retaining system of claim 17, wherein a thickness of the coating of the metallic member decreases along the longitudinal axis in a direction moving away from the connection assembly.

* * * * *